United States Patent [19]

Iwata et al.

[11] Patent Number: 4,975,924
[45] Date of Patent: Dec. 4, 1990

[54] METALLIC VAPOR LASER APPARATUS

[75] Inventors: Akihiko Iwata; Shigeo Ueguri; Kazuhiko Hara; Tatsuki Okamoto; Yoshihiro Ueda; Hiroshi Itoh, all of Hyogo, Japan

[73] Assignee: Mitsubishi Denki Kabushiki Kaisha, Tokyo, Japan

[21] Appl. No.: 346,111
[22] PCT Filed: Aug. 13, 1988
[86] PCT No.: PCT/JP88/00805
 § 371 Date: May 30, 1989
 § 102(e) Date: May 30, 1989
[87] PCT Pub. No.: WO89/01713
 PCT Pub. Date: Feb. 23, 1989

[30] Foreign Application Priority Data

Aug. 13, 1987 [JP] Japan ............................ 62-200901
Jun. 30, 1988 [JP] Japan ............................ 63-135549

[51] Int. Cl.⁵ ............................................. H01S 3/22
[52] U.S. Cl. ................................... 372/56; 372/38; 372/69
[58] Field of Search ................... 372/25, 56, 38, 70, 372/69

[56] References Cited

U.S. PATENT DOCUMENTS

| 4,004,248 | 1/1987 | Müller et al. | 372/70 |
| 4,308,507 | 12/1981 | Pleasance et al. | 372/56 |
| 4,535,458 | 8/1985 | Inoue et al. | 372/25 |

FOREIGN PATENT DOCUMENTS 0233581 9/1988 Japan ........................... 372/56

Primary Examiner—Léon Scott, Jr.
Attorney, Agent, or Firm—Sughrue, Mion, Zinn, Macpeak & Seas

[57] ABSTRACT

A metallic vapor laser apparatus comprises a discharge tube, a first pulse circuit (200) for generating a first pulse voltage for causing laser oscillation and a second pulse conduit (16) disposed separately from the first pulse circuit and generating a second pulse voltage delayed from the generation of the first pulse voltage by a predetermined time. The metallic vapor laser apparatus is constructed such that, after the first pulse voltage is applied to the discharge tube, the second pulse voltage is applied to the discharge tube and an output voltage of the second pulse circuit (16) is less than an output voltage of the first pulse circuit (200).

5 Claims, 3 Drawing Sheets

METALLIC VAPOR LASER APPARATUS

TECHNICAL FIELD

The present invention relates to a metallic vapor laser apparatus, and in particular to a metallic vapor laser apparatus for obtaining a laser output by heating, vaporizing and exciting a metal by gas discharge.

TECHNICAL BACKGROUND

FIG. 1 illustrates the construction of a conventional copper vapor laser apparatus as described on "MANUFACTURE OF COPPER VAPOR LASER", pages 60 to 66 of "Laser Research" published in March 1981. In this figure, the apparatus is constituted by a discharge tube 100, a pair of opposite electrodes 1, 1 for generating gas discharge, an inner tube 2 having therein copper particles 3 from which copper vapor is generated, an outer sleeve 4, a heat-insulating layer 5 for preventing the heat generated by discharge between the pair of electrodes 1, 1 from being lost, windows 6 disposed on the sides of the pair of electrodes 1, 1 to take out a laser beam, and an insulating break 7 disposed in an intermediate portion of the outer sleeve 4. A pulse circuit 200 is constituted by a charging capacitor 8 connected to the outer sleeve 4 of the discharge tube 100 through a connecting line a, a charging reactor 9 connected in series to the capacity 8, a diode 10 having an anode connected to one end of a high voltage power source 11 and a cathode connected to the charging reactor 9, a thyratron 12 connected to a connecting portion between the charging reactor 9 and the charging capacitor 8, and a charging resistor 14 connected in parallel to the discharge tube 100. The other end of the high voltage power source 11 is connected to the outer sleeve 4 through a connecting line b. Further, a pulse control circuit 13 is connected to a grid of the thyratron 12.

In the conventional metallic vapor laser apparatus constructed as above, a high voltage is charged from the high voltage power source 11 to the charging capacitor 8 through the diode 10, charging reactor 9 and charging resistor 14. Next, when the thyratron 12 is turned on by the pulse control circuit 13, the high electric voltage charged by the charging capacitor 8 is applied to the pair of opposite electrodes 1, 1 through the outer sleeve 4, so that gas discharge is generated within the inner tube 2. The heat energy generated by the discharge within the inner tube 2 is held by the heat-insulating layer 5 so that the temperature of the inner tube 2 is increased to a high temperature of about 1500° C., thereby vaporizing the copper particles 3 and filling the inner tube 2 with the copper vapor. Electrons in the discharge plasma are accelerated by the gas discharge formed by the pair of opposite electrodes 1, 1 and collide with the copper atoms filled within the inner tube 2, and excite the energy level of copper atoms to an upper energy level of a first resonance level, thereby forming an inverted population since the number of atoms excited to a low energy level of a metastable level is less. The copper atoms at the upper level drop to the low energy level while causing laser oscillation and further are gradually released to the ground level from the low level. The above-mentioned operations are repeatedly performed at several kHz. The laser beam is taken out of the discharge tube through the window 6. The insulating break 7 insulates the high electric voltage mentioned above.

The copper atoms at the low level are gradually released to the ground level by the collision between a wall of the inner tube 2 and the excited atoms when the diameter of the inner tube 2 is small, and by super-elastic collision between the atoms at the low level and the electrons at a low speed when the diameter of the inner tube 2 is large. The relaxation time from the low level to the ground level is several hundred $\mu$ seconds which is a long time.

In the conventional copper vapor laser apparatus mentioned above, since the relaxation time from the low level to the ground level is several hundred $\mu$ seconds which is a very long time, if a next pulse is applied to the discharge tube after completion of the relaxation, the number of pulse repetitions becomes small, and if the number of pulse repetitions are large, the inverted population becomes incomplete and the efficiency in copper vapor laser is reduced since the number of atoms at the low level is large at the time of pulse application.

Further, in the conventional pulse laser apparatus constructed as above, when the reactor 9 is reduced to increase repetition frequency to several kHz or the discharge load is varied, the voltage of the charging capacitor 8 exceeds a holding voltage of the thyratron 12 before the thyratron 12 is recovered in operation so that the thyratron 12 cannot be turned off and a short-circuit current flows from the high voltage direct current power source 11 to the thyratron 12, thereby interrupting the high voltage direct current power source 11 in operation and greatly reducing the reliability of the pulse laser.

To solve the problems mentioned above, an object of the present invention is to provide a metallic vapor laser apparatus having greatly improved reliability and efficiency even when the number of pulse repetitions is large, by promoting the relaxation from the low energy level to the ground energy level between respective pulses to make the inverted population at the subsequent pulse more complete.

SUMMARY OF THE INVENTION

The metallic vapor laser apparatus in accordance with the present invention comprises a first pulse circuit for generating a first pulse voltage for causing laser oscillation, and a second pulse circuit separately disposed from the first pulse circuit and for generating a second pulse voltage delayed from the first pulse voltage by a predetermined time.

In the present invention, a pulse voltage generated from the second pulse circuit is applied between pulses supplied from the first pulse circuit to compulsorily generate a super-elastic collision between atoms at a low energy level and electrons at a low speed. As a result, the relaxation from the low level to the ground level is promoted and the inverted population is made more complete when the pulses are applied from a thyratron pulse circuit so that the efficiency of a laser is not reduced even in high repetition of applied pulses.

BEST MODES FOR EMBODYING THE INVENTION

The apparatus of the present invention will now be described in detail with reference to the accompanying drawings.

Figure 1:
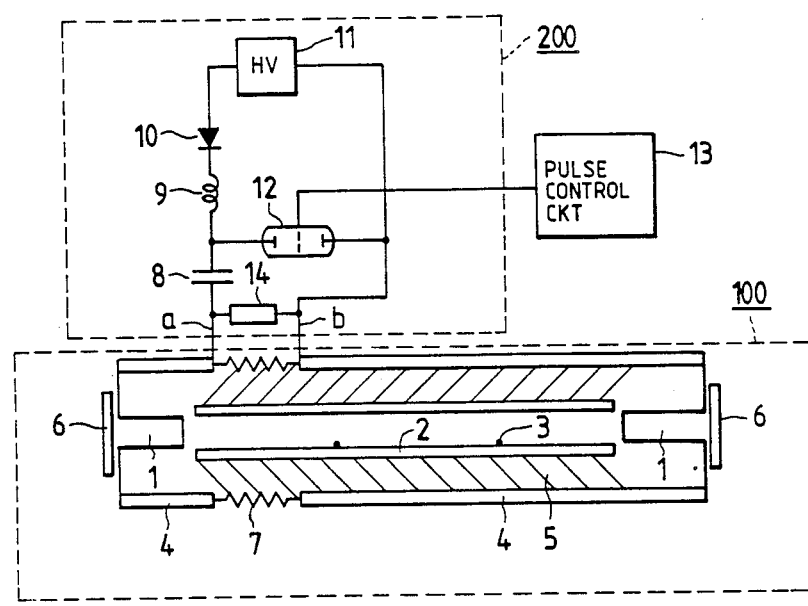
FIG. 1 is a constructional view of a conventional metallic vapor laser apparatus.
Figure 2:
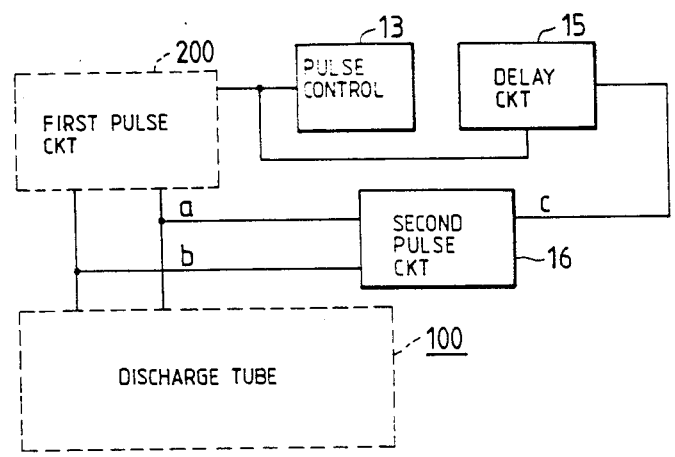
FIG. 2 is a constructional view of a metallic vapor laser apparatus in accordance with one embodiment of the present invention.

FIG. 2 is a block diagram showing the construction of a copper vapor laser apparatus in accordance with one embodiment of the present invention. In this figure, a discharge tube 100 and a pulse control circuit 13 are similar to the conventional ones. A first pulse circuit 200 corresponds to a first pulse circuit 200 of FIG. 1. A delay circuit 15 is connected to a pulse control circuit 13 on the input side thereof and receives a signal from the pulse control circuit 13 and delays this signal by a predetermined time. A second pulse circuit 16 is connected in parallel to the first pulse circuit 200 and is connected to the output side of the delay circuit 15. The second pulse circuit 16 is connected to the discharge tube 10 on the output side of the circuit and applies a voltage to the discharge tube 100 by receiving a signal from the delay circuit 15.

Figure 3:
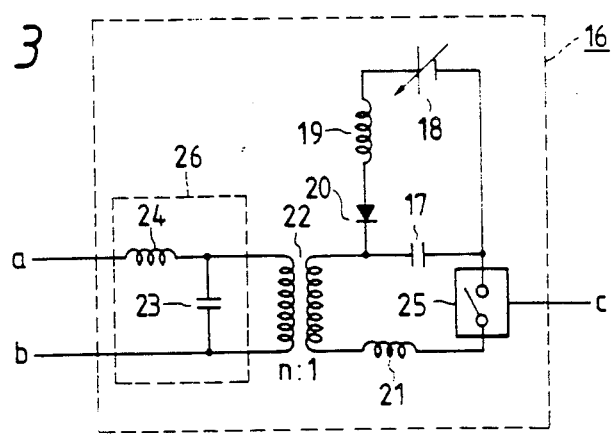
FIG. 3 is a circuit diagram of second pulse circuit 16 of FIG. 2.

FIG. 3 is a circuit diagram showing in detail the second pulse circuit 16 of FIG. 2. In this figure, a connecting line a is connected to one end of a secondary side of a pulse transformer 22 having winding ratio n : 1 through a filter reactor 24, and a connecting line b is connected to the other end of the secondary side of the pulse transformer 22. A filter capacitor 23 is connected in parallel to the filer reactor 24, and the filter capacitor 23 and filter reactor 24 constitute a protecting circuit 26. The one end of the primary side of the pulse transformer is connected to the positive electrode side of a direct current power source 18 through a diode 20 having a reversed polarity and a pulse charge reactor 19, and is connected to one end of a self arc-extinguishing type switch 25 through a pulse capacitor 17. The other end of the primary side of the pulse transformer 22 is connected to the other end of the self arc-extinguishing type switch 25 through a pulse reactor 21. The negative electrode side of the direct current power source 18 is connected to one end of the above self arc-extinguishing type switch 25. Further, a connecting line c is connected to the above self arc-extinguishing type switch 25.

Figure 4:
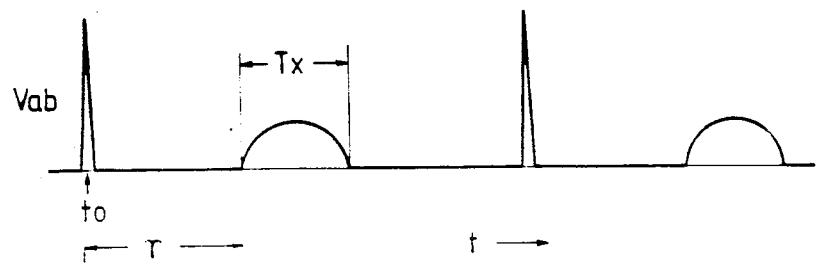
FIG. 4 is a time chart showing a voltage applied to discharge tube 100 of FIG. 2 and signal waveforms in respective portions thereof.

FIG. 4 illustrates a time chart showing a voltage applied to the discharge tube 100 in accordance with one embodiment of the present invention.

The operation of the apparatus will next be described. In the copper vapor laser apparatus constructed as above, the delay circuit 15 receives and delays an output signal outputted from the pulse control circuit 13 by a predetermined time, and thereafter provides a signal to the second pulse circuit 16. The second pulse circuit 16 receiving the signal from the delay circuit 15 turns on the self arc-extinguishing type switch 25 and supplies a pulse to the discharge tube 100 and then charges a direct current voltage from the direct current power source 18 to the pulse capacitor 17 through the pulse charge reactor 19 and the diode 20 as shown in FIG. 3. Namely, when the self arc-extinguishing type switch 25 is turned on by receiving the signal from the delay circuit 15, the voltage stored in the pulse capacitor 17 is applied to the pulse transformer 22 and the pulse reactor 21. A voltage larger by n times than that on the primary side of the pulse transformer 22 is generated on the secondary side thereof and a pulse voltage is applied to the discharge tube 100 through the filter capacitor 23 and the filter reactor 24. FIG. 4 shows the voltage $V_{ab}$ applied between connecting lines a and b with respect to time. The pulse voltage from the first pulse circuit 200 is applied to the discharge tube 100 at time $t_0$ to cause laser oscillation. A pulse voltage delayed by determined time $\tau$ from time $t_0$ is applied from the second pulse circuit 16 to the discharge tube. Such an operation is performed constantly and repeatedly. The filter reactor 24 and the filter capacitor 23 are constructed as a low pas filter such that the voltage from the first pulse circuit 200 is interrupted and the voltage from the second pulse circuit 16 is transmitted. The width $T_x$ of the pulse voltage from the second pulse circuit 16 is determined by inductance $L_x$ of the pulse reactor 21 and capacitance $C_x$ of the pulse capacitor 17 in accordance with the following formula.

$$T_x \approx \pi \sqrt{L_x \cdot C_x}$$

The width $T_x$ of the pulse voltage is larger than the width of the pulse voltage outputted from the first pulse circuit 200.

In the copper vapor laser apparatus, the relaxation of the low energy level to the ground energy level is performed by the super-elastic collision between the atoms at the low level and electrons at a low speed when the diameter of the inner tube 2 is large. Namely,

where Cu* is an atom at the low level, Cu is an atom at the ground level, $e_{(slow)}$ is an electron at the low speed, and $e_{(fast)}$ is an electron at a high speed.

The voltage applied from the second pulse circuit 16 is a low voltage which does not excite the copper atoms to an upper energy level, but accelerates the electrons so that the electrons and the copper atoms strongly collides with each other. As a result, the super-elastic collision between the atoms at the low level and the electrons frequently occurs so that the relaxation from the low level to the ground level is promoted.

In the above embodiment, the voltage stored in the pulse capacitor 17 is applied to the discharge tube 100, however the direct chopping of direct current power source 18 may be used.

Further, in the above embodiment, the self arc-extinguishing type switch 25 is used, however any type of switch may be used if the turning-off state of the switch is provided.

Figure 5:
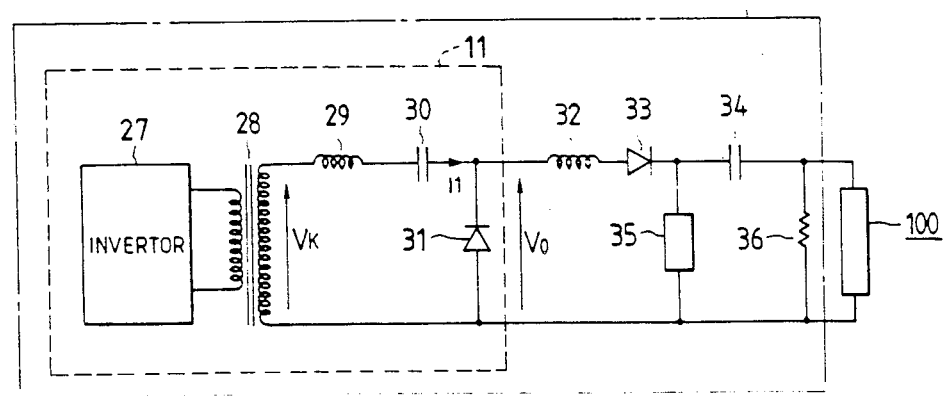
FIG. 5 is a circuit diagram of first pulse circuit 200 of FIG. 2.

FIG. 5 shows one example of the first pulse circuit 200 of FIG. 2 in the embodiment of the present invention.

In this figure, reference numeral 27 denotes an inverter, 28 a step-up transformer for increasing an output voltage from the inverter 27, 29 a first reactor connected to one end of the secondary side of the step-up transformer 28, and 30 a first capacity connected to one end of the secondary side of the step-up transformer 28 through the first reactor 29. The first capacitor 30, first reactor 29, step-up transformer 28 and inverter 27 constitute a high voltage power source 11. A first diode 31 is connected in parallel to the high voltage power source 11, and a second reactor 32 is connected to one end of the high voltage power source 11. An inductance value of the first reactor 29 is half the inductance value of the second reactor 32. A second diode 33 is connected in series to the high voltage power source 11 through the second reactor 32. The cathode of the second diode 33 is connected to one end of the discharge tube 100 through a second charging capacitor 34. The capacitance of the second capacitor 34 is half the capacitance of the first capacitor 30. A thyratron 35 as a non-self arc-extinguishing type switch is connected in parallel to the high voltage power source 11, and a resistor 36 is connected in parallel to the discharge tube 100 and the other end of the discharge tube 100 is connected to the other end of the high voltage power source 11.

Figure 6:
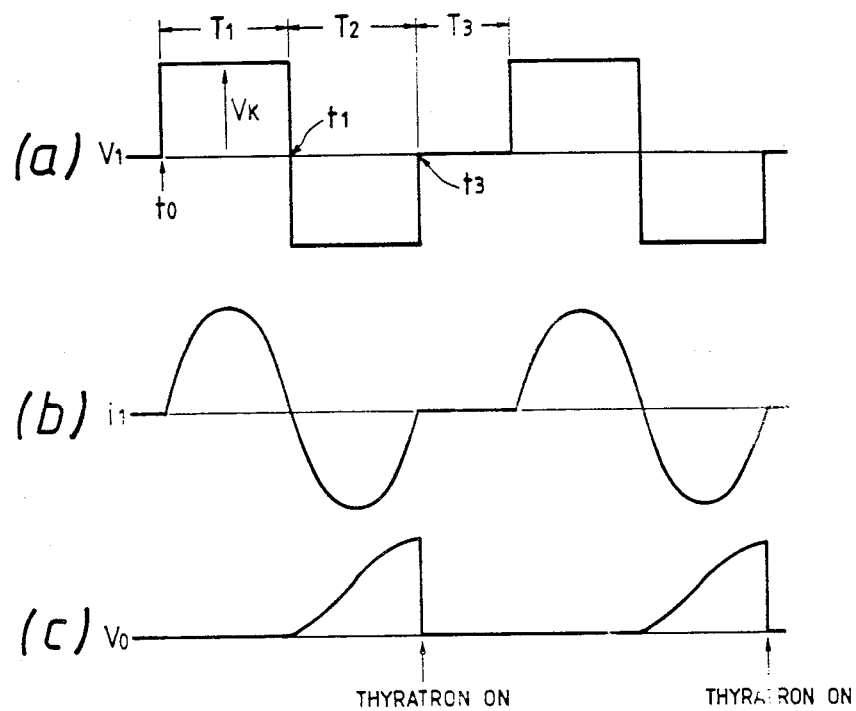
FIG. 6 is a time chart showing signal waveforms in respective portions of the circuit of FIG. 5.

The operation of the above apparatus will now be described. FIG. 6 is a time chart showing signal waveforms in respective portions of the circuit of FIG. 5. When the inverter 27 is turned on at time $t_0$ and an output is generated therefrom as shown in FIG. 6(a), a voltage is applied to the first reactor 29 and the first capacitor 30 through the first diode 31 so that electric current $i_1$ having a sine wave as shown in FIG. 6(b) flows through the first reactor and the first capacitor. The voltage of the first capacitor 30 is charged to twice the secondary side voltage $V_k$ of the step-up transformer 28 at time $t_1$. When the polarity of the inverter 27 is inverted after time $t_1$, the first diode 31 is turned off, and the secondary side voltage $V_1$ ($V_1=V_k$ in this case) of the step-up transformer 28 and voltage $2V_k$ stored in the first capacitor 30 are applied to the first reactor 29, second reactor 32, second diode 33, second charging capacitor 34 and a parallel circuit composed of the discharge tube 100 and the resistor 36. The charge stored in the first capacitor 30 is charged to the second charging capacitor 34 as shown in FIG. 6(c) through the resistor 36 in accordance with a resonance waveform determined by the first and second reactors 29, 32 and the first and second capacitors 30 and 34. When the capacitance of the first capacitor 30 is $C_1$ and the capacitance of the second charging capacitor 34 is $C_2$ and the inductance values of the first and second reactors 29 and 32 are respectively $L_1$ and $L_2$, $V_0$ at time $t_3$ is represented by the following formula.

$$V_0 = \frac{\frac{C_1 C_2}{C_1 + C_2}}{C_2} \cdot 3 \cdot V_k \left\{ \left( 1 - \cos \frac{1}{\sqrt{(L_1 + L_2) \cdot \frac{C_1 C_2}{C_1 + C_2}}} t_3 \right) \right\}$$

Accordingly, if $C_2 = C_1/2$, $$V_0 = 4 V_k$$

That is, voltage $V_0$ is increased up to four times as large as voltage $V_k$. If value $L_1$ is set to be twice the value $L_2$, period $T_2$, which is half the resonance period, becomes equal to period $T_1$ and the positive and negative voltage applying periods to the inverter 27 are equal to each other so that the step-up transformer 28 is not magnetized in a polarized state.

When voltage $V_0$ is increased up to voltage $4 V_k$ at time $t_3$, the thyratron 35 is turned on and the charge stored in the second charging capacitor 34 is supplied to the discharge tube 100. After the thyratron 35 is turned on and period $T_3$ has passed, the inverter 27 is operated again, thereafter performing the similar operation repeatedly. Period $T_3$ becomes a parameter for determining the really repeated period. The thyratron 35 is in a zero bias state in periods $T_3$ and $T_1$, and the recovering time of the thyratron 35 is secured by periods $T_1$ and $T_3$. Even when a maximum repetition frequency in this system is provided by making period $T_3$ to be zero, for example, since the recovering time of the thyratron 35 is generally 10 to 20 $\mu$ seconds even in the case of a large-sized thyratron, the recovering time of thyratron can be secured and the repetition frequency can be increased up to several ten kHz when period $T_1$ is set to be greater or equal to 10 to 20 $\mu$ seconds.

Further, since the charge voltage of the second capacitor 34 can be increased up to four times the output voltage $V_k$ of the step-up transformer 28 bu utilizing the resonance between the reactors and capacitors, voltage $V_k$ is half the output of the conventional high voltage direct current power source so that it is easy to insulate the step-up transformer 28 and further the step-up transformer 28 can be made compact and thereby the entire high voltage power source 11 can be made compact. Namely, since the charging capacitor voltage is normally about 10 to 20 KV, which is twice as large as the power source voltage $V_0$, about 5 to 10 KV is needed for the power source voltage $V_0$, thereby increasing the size of the conventional high voltage direct current power source and the entire apparatus in view of problems such as designs for insulation. However, in the present invention, since the charge voltage can be increased up to four times the above output voltage, the high voltage power source having a large size for insulation can be made compact and thereby the entire apparatus can also be made compact. Further, since the inverter 27 is basically operated in a current resonance type, the loss in switching operation of the inverter 27 is reduced and the size of the inverter 27 can be reduced.

As mentioned above, in the first pulse circuit 200 according to one embodiment of the present invention, the high voltage power source is constructed by the step-up transformer operated by the inverter, the first reactor, the first capacitor and the diode so as to perform double voltage rectification. Accordingly, the recovering time of the non-self arc-extinguishing type switch can be secured and the reliability can be greatly improved.

In the above example of the first pulse circuit 200, the first and second reactors are disposed on the secondary side of the step-up transformer, but the effects similar to those in the above example can be obtained even when these reactors are disposed on the primary side of the step-up transformer.

Further, in the above example, the description is made by using the thyratron as a non-self arc-extinguishing type switch, but the effects similar to those in the above example can be obtained even when a thyristor is used.

As mentioned above, in the present invention, a second pulse circuit is disposed separately from a first pulse circuit and, after a pulse voltage from the first pulse circuit is applied to a discharge tube, a pulse voltage from the second pulse circuit is applied to the discharge tube again with a predetermined delayed time. Accordingly, the relaxation time from the low energy level to the ground energy level is reduced so that the inverted population becomes more complete at the applying time of a subsequent pulse from the first pulse circuit, thereby providing a metallic vapor laser apparatus which is high in efficiency even in the high repetition of pulses.

What is claimed is:

1. A metallic vapor laser apparatus comprising a discharge tube, a first pulse circuit for generating a first pulse voltage for causing laser oscillation exhibiting a first relaxation time and a second pulse circuit for generating a second pulse voltage delayed from said first pulse voltage by a predetermined time for changing said first relaxation time to a second relaxation time shorter than said first relaxation time, wherein said second pulse voltage is applied to said discharge tube after said first pulse voltage is applied to said discharge tube, and an output voltage of said second pulse circuit is less than an output voltage of said first pulse circuit, said second pulse voltage generating to generate a super elastic collision between vapor atoms having a low energy level and electrons at low speed thereby reducing the first relaxation time.

2. A metallic vapor laser apparatus as claimed in claim 1, wherein said first pulse circuit comprises a high voltage power source constituted by a step-up transformer operated by inverter, a first capacitor and a diode for doubling and rectifying an output voltage of said step-up transformer, a second charging capacitor connected in parallel to said discharge tube and receiving an output voltage of said high voltage power source, and a non-self arc-extinguishing type switch for supplying a voltage of said second charging capacitor to said discharge tube.

3. A metallic vapor laser apparatus as claimed in claim 2, wherein the capacitance of said second charging capacitor is set to be half that of said first capacitor.

4. A metallic vapor laser apparatus as claimed in claim 2, wherein said non-self arc-extinguishing type switch is constituted by a thyratron.

5. A metallic vapor laser apparatus as claimed in claim 2, wherein said non-self arc-extinguishing type switch is constituted by a thyristor.

* * * * *